United States Patent
Kim et al.

(10) Patent No.: US 7,072,324 B1
(45) Date of Patent: Jul. 4, 2006

(54) DEVICE AND METHOD FOR PROVIDING TIME SWITCHED TRANSMISSION DIVERSITY IN MOBILE COMMUNICATION SYSTEM

(75) Inventors: Young-Ky Kim, Seoul (KR); Jae-Min Ahn, Seoul (KR); Soon-Young Yoon, Seoul (KR); Hi-Chan Moon, Seoul (KR); Sang-Sung Han, Kunpo-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/253,976

(22) Filed: Feb. 22, 1999

(30) Foreign Application Priority Data

Feb. 21, 1998 (KR) ............................................. 98/5526

(51) Int. Cl.
*H04B 7/216* (2006.01)

(52) U.S. Cl. .................. 370/342; 455/101; 370/203; 370/220; 370/320; 370/335; 375/267; 375/299; 375/132; 375/347

(58) Field of Classification Search ................ 370/342, 370/411, 320, 328, 335, 203, 210, 220; 375/137, 375/136, 267, 299, 327, 146, 349, 144, 148, 375/132, 149, 347; 455/101; 378/347
See application file for complete search history.

(56) References Cited

U.S. PATENT DOCUMENTS

| 5,233,626 A | * | 8/1993 | Ames ............................. 375/1 |
| 6,006,075 A | * | 12/1999 | Smith et al. ................. 455/101 |
| 6,111,909 A | * | 8/2000 | Taki ............................ 375/132 |
| 6,175,587 B1 | * | 1/2001 | Madhow et al. ............ 375/148 |
| 6,185,199 B1 | * | 2/2001 | Zehavi ........................ 370/335 |

FOREIGN PATENT DOCUMENTS

| DE | 42 19 677 | 6/1992 |
| EP | 0 740 430 | 10/1996 |
| JP | 06-085744 | 3/1994 |
| JP | 08-195704 | 7/1996 |
| JP | 09-008716 | 1/1997 |

OTHER PUBLICATIONS

Rappaport, "Wireless Communications," 1996, pp. 274–278, 336–338.*
Gibson "Communications Handbook," 1997, pp. 200–202.*
Rappaport, "Wireless Communications," 1996, pp. 519–533.*
Gibson "Communications Handbook," 1997, pp. 93–105.*
Japanese Office Action dated Jan. 14, 2003, issued in a counterpart application, namely Appln. No. 11-542395.

* cited by examiner

*Primary Examiner*—Nay Maung
*Assistant Examiner*—Shaima Q. Aminzay
(74) *Attorney, Agent, or Firm*—Dilworth & Barrese LLP

(57) ABSTRACT

The invention provides a method and apparatus for transmitting signalling information to a receiver using a plurality of transmission antennas in a time switching configuration. The apparatus includes a controller for generating a switch controlling signal in a non-overlapped time cycle for selecting one of the plurality of transmission antennas to output a transmission signal in a fixed, non-overlapped time interval. The invention further provides for a receiving device for detecting a pilot channel signal from an input forward link signal and generating estimated phase and time values for detecting a traffic channel signal at the selected estimated time position and correcting a phase error of the detected traffic channel signal based on the estimated phase value, for signal decoding.

15 Claims, 14 Drawing Sheets

DEVICE AND METHOD FOR PROVIDING TIME SWITCHED TRANSMISSION DIVERSITY IN MOBILE COMMUNICATION SYSTEM

BACKGROUND OF THE INVENTION

1. Field of the Invention

The present invention relates generally to the field of communication systems, and particularly to a method and apparatus for transmitting/receiving data with a time switched transmission diversity (TSTD) function.

2. Description of the Related Art

In a mobile communication system, data transmission/reception performance can generally be enhanced by utilizing diversity techniques in a fading environment. Typically, as shown in FIG. 1 three diversity techniques are applicable to the forward link and a single diversity technique (i.e., receiver diversity) is applicable to the reverse link. Data can be received on the reverse link with receiver diversity by equipping a base station with a plurality of reception antennas. For the forward link, the three well known diversity techniques include transmission diversity, receiver diversity, and mixed diversity. In transmission diversity, a base station transmits a signal through a plurality of transmission antennas and a mobile station receives the signal through a single reception antenna to achieve the same effect as if multiple reception antennas were used. Receiver diversity is provided when the mobile station has a plurality of reception antennas, and mixed diversity is defined as a combination of the two aforementioned techniques.

Receiver diversity on the forward link, however, is problematic in that diversity gain is low because of the small terminal size which limits the distance between reception antennas. Another problem is that the use of multiple reception antennas requires a separately procured hardware configuration for receiving a forward link signal and transmitting a reverse link signal through a corresponding antenna, thereby imposing constraints on the size and cost of the terminal. In view of these problems, mobile communication systems typically employ transmission diversity exclusively on the forward link.

FIG. 2 illustrates a general block diagram of a mobile communication system employing transmission diversity on a forward link. A base station 100 and a mobile station 200 include transmitting and receiving apparatus, respectively. A baseband signal processor 103 of base station 100 converts user data for transmission on the forward link into a baseband signal. Such conversion by baseband signal processor 103 includes channel encoding, interleaving, orthogonal modulation, and PN (Pseudo Noise) spreading. A signal distributor 102 distributes the signals received from the baseband signal processor 103 into N signal streams with each stream being provided to one of N transmission antennas TXAI to TXAN. As a result, transmission diversity is achieved at the transmission end of the base station 100 through the N antennas.

The mobile station 200 has a single reception antenna RXA for receiving signals from the base station 100 from the N transmission antennas. To process the received signals, the mobile station 200 includes N demodulators 201 to 20N corresponding to each N transmission antenna. A combiner 211 combines demodulated signals received from the demodulators 201 to 20N, and a decoder & controller 213 decodes a signal received from the combiner 211 to produce decoded user data.

In contrast, the structure of a transmitter in a non-transmission diversity (NTD) CDMA communication system is described with reference to FIG. 3. A base station 300 includes a CRC (Cyclic Redundancy Check) generator 311 for adding CRC bits to input user data in order to detect a frame error which occurs while sending the user data. A tail bit generator 313 adds tail bits indicating termination of a data frame to the data frame prior to channel encoding. Then, a channel encoder 315 encodes the data frame for error correction and an interleaver 317 interleaves the encoded data. A combiner 323 performs an exclusive-OR operation on the interleaved data with a long code sequence. This long code sequence is generated in a long code generator 319 and decimated in a decimator 321 at the same rate as that at the output terminal of the interleaver 317. A signal mapper 325 converts 0s and 1s of the encoded data received from the combiner 323 to +1s and −1s respectively, for orthogonal modulation. A serial-to-parallel (S/P) converter 327 divides the signal received from the signal mapper 325 into I channel and Q channel streams, for QPSK (Quadrature Phase Shift Keying) modulation. The I channel and Q channel streams are subject to orthogonal modulation in multipliers 329 and 331 and PN spreading in a PN spreader 333. The spread signals are filtered for pulse shaping in LPFs (Low Pass Filters) 335 and 337, loaded on a carrier by mixers 339, 341, combined with combiner 343, and finally transmitted through a transmission antenna.

The transmit signal which is output from the NTD transmitter in the base station 300 illustrated in FIG. 3 has a signal structure indicated by 511 of FIG. 5. Specifically, FIG. 5 illustrates timing characteristics for the case of transmitter diversity and no diversity. Specifically in the case of no diversity, FIG. 5 illustrates user data output from the NTD 511 transmitter, and for the diversity case. FIG. 5 further illustrates timing characterization from an orthogonal transmission diversity (OTD) transmitter with two antennas, A & B (N=2).

FIG. 4 is a block diagram of an OTD transmitter with two transmission antennas (N=2). Improved performance of a forward link is achieved in the OTD transmitter by dividing information for one user into two or more streams and transmitting the divided data through the plurality of transmission antennas, as indicated by 513 and 515 of FIG. 5. The following description is conducted with the understanding that $[W_m\text{-}W_m]$ is identical to $[W_m\overline{W_m}]$.

The OTD transmitter, illustrated in FIG. 4, operates in the same manner as the NTD transmitter of FIG. 3, except for a serial-to-parallel conversion process. In the OTD structure, mapped data branches into N streams, corresponding to the number of transmission antennas in S/P converters 413, 415, and 417, and orthogonally modulated in multipliers 419, 421, 423, and 425, for maintaining mutual orthogonality between the transmission antennas.

In addition to orthogonal modulation, orthogonal codes may be further utilized to ensure mutual orthogonality among the N antennas. The orthogonal code extension is accomplished by a Hadamard matrix extension. In the case of the OTD transmitter with two transmission antennas A and B(i.e., A and B as shown in FIG. 4) the different orthogonal codes assigned to the antennas are respectively $[W_m W_m]$ and $[W_m\text{-}W_m]$, extended from an orthogonal code $W_m$ of a length $2^m$ used in the NTD transmitter. The purpose of orthogonal code extension is to compensate for the data rate of each of the N streams, which is 1/N of the data rate prior to serial-to-parallel conversion.

A receiver for receiving a signal from the OTD transmitter requires signal demodulators for demodulating user data, a pilot demodulator for providing timing and phase information to be provided to the signal demodulates, and a parallel-to-serial (P/S) converter for converting M signal demodulator outputs to a serial signal stream.

A pilot channel is used by the base station to provide timing and phase information to a mobile station. The mobile station first activates the pilot demodulator to acquire necessary timing and phase information and demodulates user data based on the acquired information. For an OTD transmitter, each transmission antenna should be assigned a unique pilot channel.

In a receiver for use with a conventional OTD transmitter of FIG. 4, the pilot demodulator subjects a received signal to PN despreading and orthogonal demodulation and integrates the resulting signal for one cycle in order to demodulate a pilot channel from the received signal. A time estimator and a phase estimator in the pilot demodulator estimate timing and phase values from the integrated value.

A signal demodulator of the receiver performs PN despreading on a user data signal based on timing information received from the pilot demodulator. A phase error which occurs during transmission is compensated for by multiplying the phase information by an integrated value. The integrated value is obtained by integrating an orthogonally modulated signal for one cycle. The phase-compensated integrator output is converted to a probability value by a soft decision block and fed through the P/S converter to a deinterleaver.

Despite improved reception performance as compared to the NTD system, the conventional OTD mobile communication system has certain limitations. First, given that a terminal should be equipped with a number of pilot demodulators and signal demodulators corresponding to the number of transmission antennas of a base station, this results in an increase in the complexity, cost, and power consumption of a receiver.

Another drawback associated with a conventional OTD system is that the length of an orthogonal code used is increased by N times from that of an NTD case, for N transmission antennas. As a result, the integration interval is extended, thereby degrading reception performance in a frequency error-susceptible channel environment.

A further limitation is that the number of available transmission antennas is restricted to be a power of 2, namely $2^n$ which imposes constraints concerning a number of applications involving antenna arrays. There exists a need, therefore, for a diversity scheme which overcomes the limitations of the prior art.

SUMMARY OF THE INVENTION

An object of the present invention is to provide a time switched transmission diversity (TSTD) apparatus and method for distributing a signal of a base station to a plurality of antennas via time switching.

Another object of the present invention is to provide a receiver for receiving a signal from a TSTD transmitter.

A further object of the present invention is to provide a TSTD communication apparatus and method in a mobile communication system, in which the length of an orthogonal code remains the same as that required in a conventional mobile communication system.

Still another object of the present invention is to provide a receiver and a receiving method in a TSTD mobile communication system, in which a single signal demodulator is utilized irrespective of the number of transmission antennas employed to achieve transmission diversity.

A still further object of the present invention is to provide a transmitter and a transmitting method in a TSTD mobile communication system, where the number of transmission antennas can be easily increased.

According to one aspect of the present invention, the above objects are achieved by providing a time diversity transmitting apparatus in a base station of a mobile communication system. The transmitting apparatus includes a plurality (N) of transmission antennas with a corresponding number of radio frequency transmitters connected therewith for outputting signals on a forward link. The transmitter further includes a controller for generating a switch controlling signal in a non-overlapped time cycle, an orthogonal modulator for modulating a transmit signal by an orthogonal code, a spreader for spreading the output of the orthogonal modulator, and a switch connected to an output terminal of the spreader, for connecting the output of the spreader to a corresponding transmitter based on the switch controlling signal.

According to another aspect of the present invention, there is provided a receiving device in a mobile station of a mobile communication system. The receiving device has a pilot channel receiver for detecting a pilot channel signal from an input forward link signal and generating estimated phase and time values, a controller for generating a selection control signal based on cycle information and switching pattern information, in synchronization of a reference time to a base station, a selector for selectively outputting the estimated phase and time values received from the pilot channel receiver based on the selection control signal, and a traffic channel receiver for detecting a traffic channel signal at the selected estimated time position and correcting a phase error of the detected traffic channel signal based on the estimated phase value, for signal decoding.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

A mobile communication system according to an embodiment of the present invention distributes user data to a plurality of transmission antennas by time switching to achieve transmission diversity. The system further demodulates the time diversity-based signal in a single signal demodulator. The features of time diversity according to the present invention may be summarized as:

(1) A single signal demodulator is provided for demodulating user data regardless of the number N of transmission antennas utilized. That is, only one orthogonal code is available per user. As such, the single demodulator simplifies the receiver design, accommodates low power dissipation and results in low terminal costs;

(2) The length of an orthogonal code is the same as that of an orthogonal code used in an NTD device, regardless of the number N of transmission antennas. This implies that there is no increase of an integration interval for providing time diversity; and (3) The number of available transmission antennas is not restricted to be a power of 2, $2^n$ but is limitlessly extensible, thereby imposing no constraints on other applications.

Prior to describing the structure and operation of a transmitter in a base station and a receiver in a terminal according to the embodiment of the present invention, it is to be noted that the method of time diversity in accordance with the present invention is applied to the forward link in a mobile communication system of the present invention.

Figure 1:
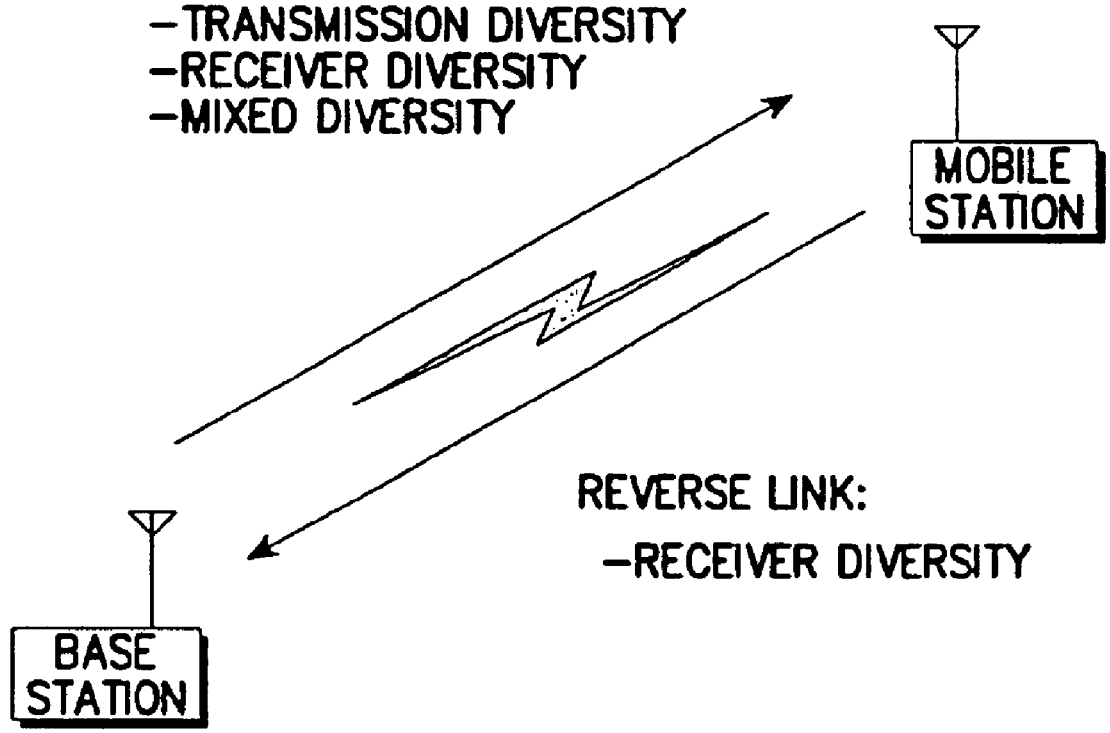
FIG. 1 illustrates diversity techniques on forward and reverse links in a mobile communication system.
Figure 2:
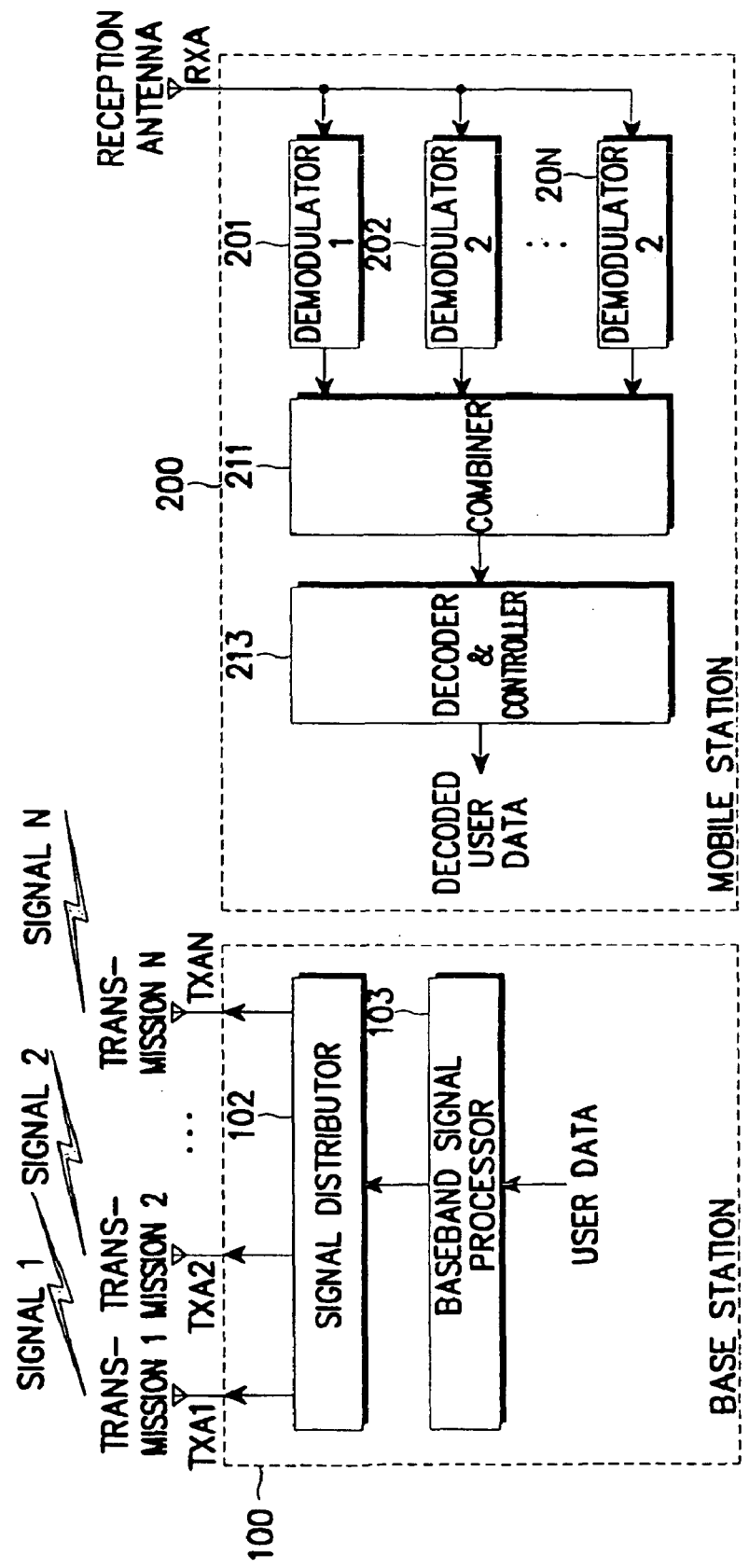
FIG. 2 is a block diagram of a transmission diversity-based apparatus on a forward link in a mobile communication system according to the present invention.
Figure 3:
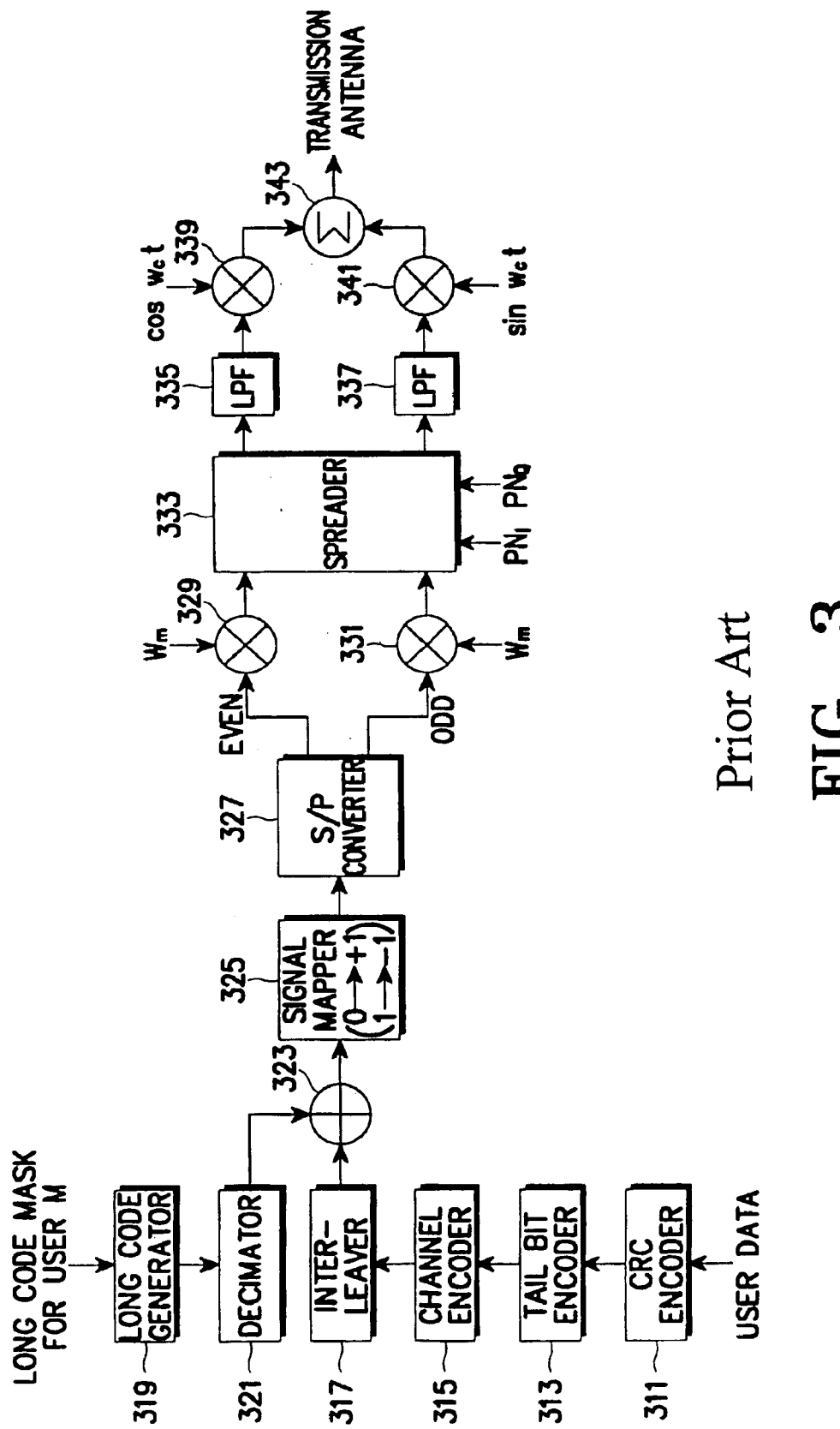
FIG. 3 is a block diagram of an NTD transmitter in a mobile communication system according to the prior art.
Figure 4:
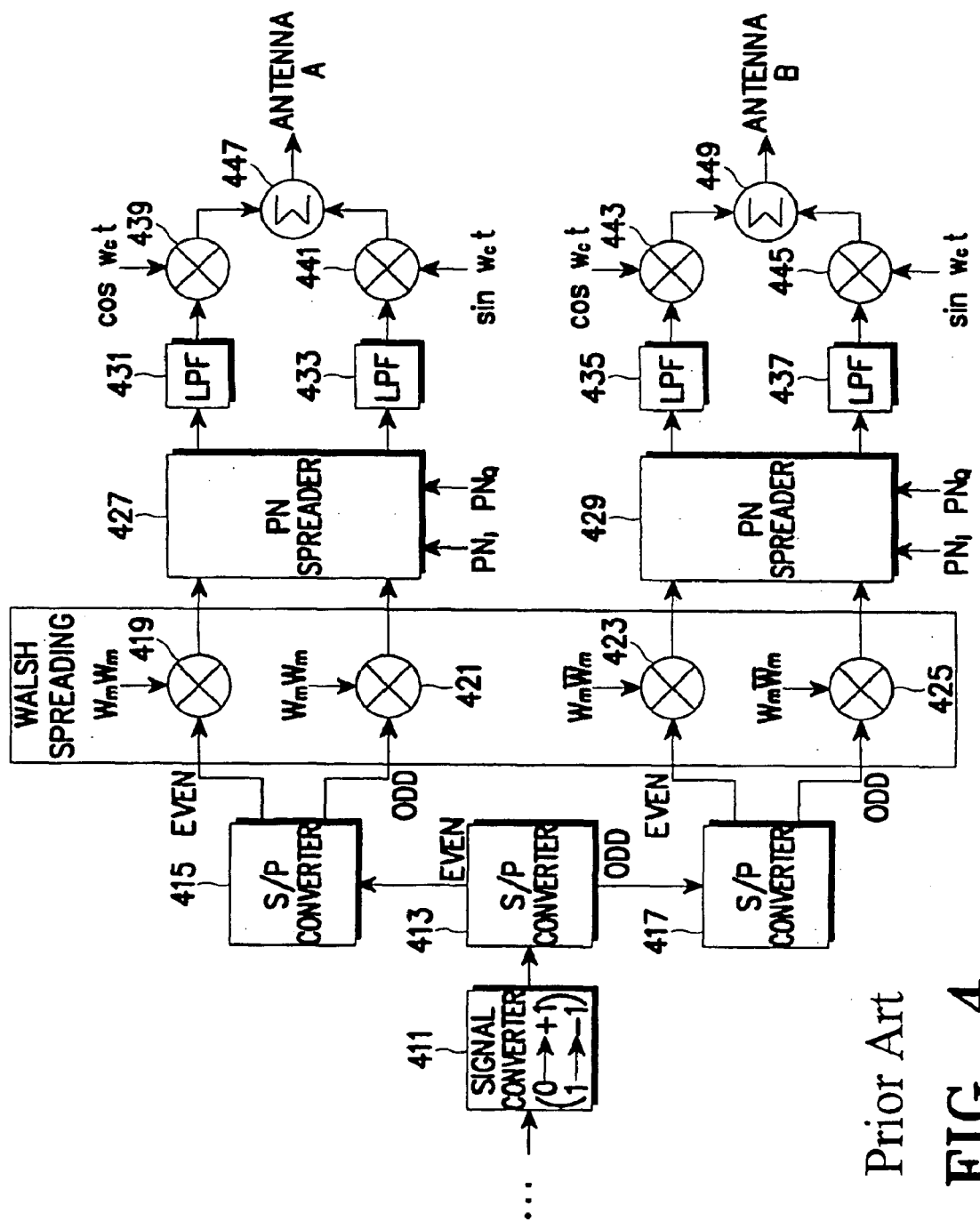
FIG. 4 is a block diagram of a conventional OTD transmitter in a mobile communication system according to the prior art.
Figure 5:
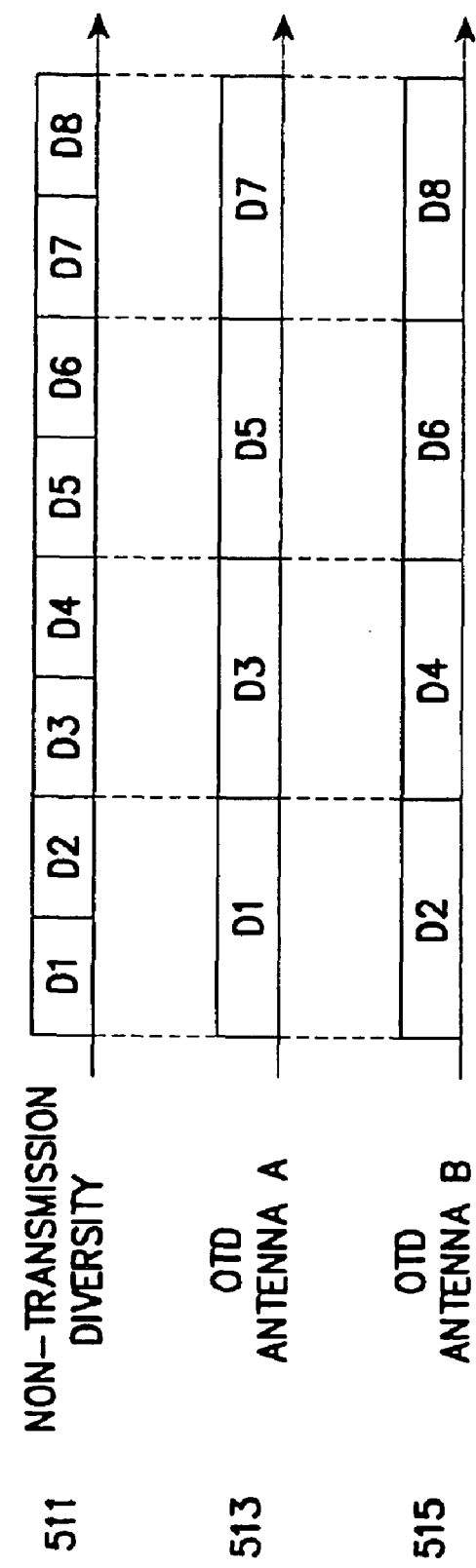
FIG. 5 illustrates data structures transmitted from the NTD and OTD transmitters shown in FIGS. 3 and 4, respectively.
Figure 6:
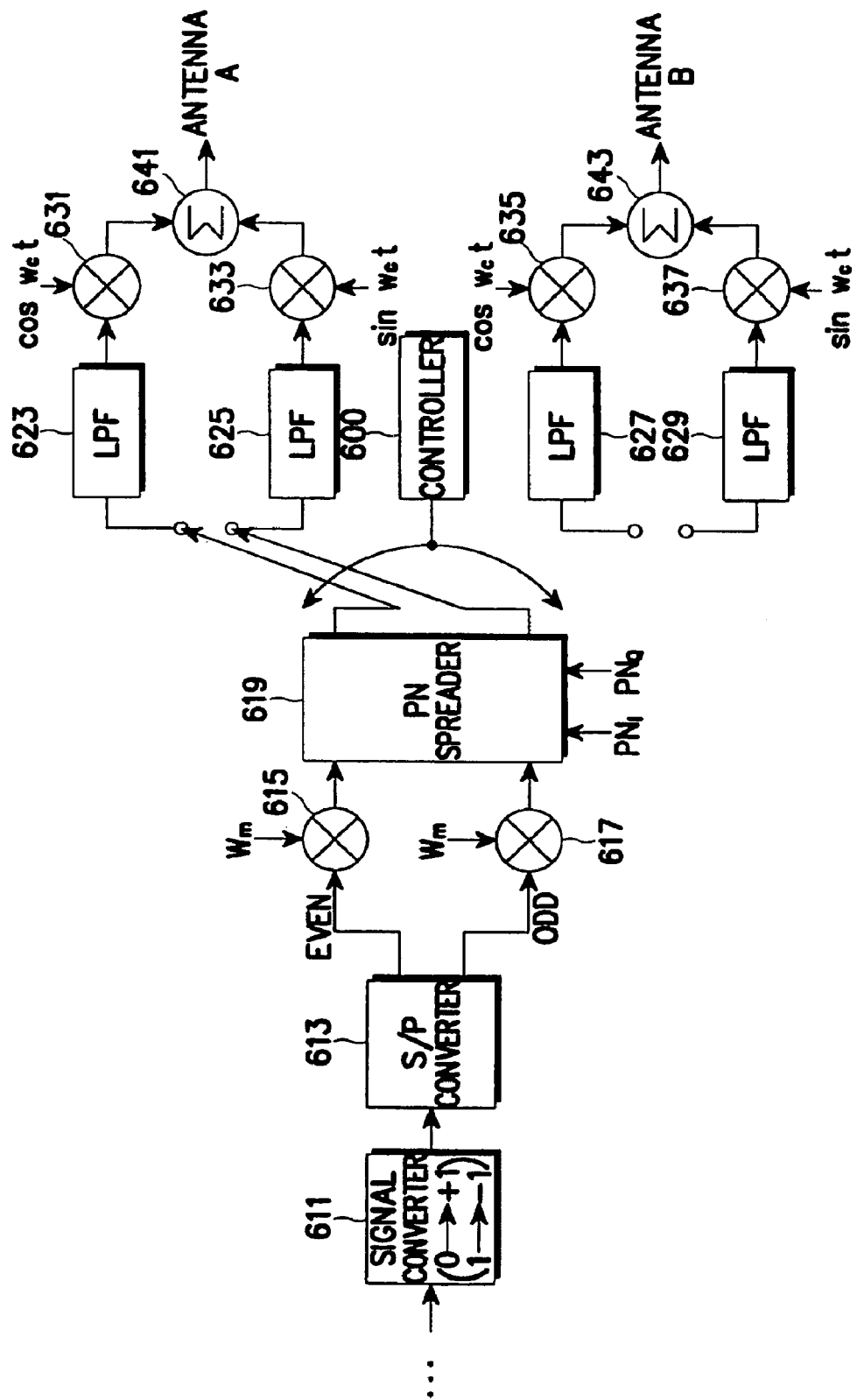
FIG. 6 is a block diagram of a TSTD transmitter in a mobile communication system according to an embodiment of the present invention.

FIG. 6 is a block diagram of a TSTD transmitter with two (N=2) transmission antennas in a base station according to the present invention.

Referring to FIG. 6, a signal mapper 611 receives a signal resulting from combining encoded user data with a long code whereby the long code changes the level of the received signal by converting 0s and 1s to +1s and −1s, respectively. An S/P converter 613, coupled to the signal mapper output, converts a serial signal received from the signal mapper 611 to an odd-numbered signal and an even-numbered signal. A multiplier 615, coupled to the even output of the S/P converter, multiplies the even-numbered signal by an orthogonal code $W_m$. A multiplier 617, coupled to the odd output of the S/P converter, multiplies the odd-numbered signal by an orthogonal code $W_m$. These multipliers 615 and 617 function to subject a user signal to orthogonal modulation (i.e., orthogonal spreading) by multiplication. The orthogonal code can be a Walsh code. A PN spreader 619 multiplies the orthogonally modulated signals received from the multipliers 615 and 617 by corresponding PN sequences $PN_I$ and $PN_Q$, for PN spreading (or PN masking) of a signal to be transmitted.

A controller 600 generates a switch controlling signal for distributing a transmit signal to a plurality of antennas in the TSTD transmitter of the present invention. The controller 600 synchronizes to a GPS (Global Positioning System) signal in a synchronous mode and a switching cycle is an integer multiple of the orthogonal code length. In addition, a look-up table for storing switching information with respect to a hopping pattern may be provided to the controller 600 in an alternate embodiment whereby time switching is performed in a specific pattern.

A switch 621 switches in response to a switch controlling signal output by the controller 600, and has a common terminal coupled to output terminals of the PN spreader 619 from which I channel and Q channel spread signals are transmitted, a first output terminal coupled to LPFs 623 and 625, and a second output terminal coupled to LPFs 627 and 629. As previously stated, the switch 621 switches based on a switch controlling signal received from the controller 600 and selectively outputs the spread signals received from the PN spreader 619 to the low pass filters LPFs 623 and 625 or to the LPFs 627 and 629.

The LPFs 623 and 625 low-pass-filter the I channel and Q channel PN spread signals received from the switch 621. Multipliers 631 and 633 multiply outputs of the LPFs 623 and 625 by carriers, for frequency up conversion. An adder 641 adds signals received from the multipliers 631 and 633 and sends the resulting signal to a transmission antenna A.

The LPFs 627 and 629 low-pass-filter the I channel and Q channel PN spread signals received from the switch 621. Multipliers 635 and 637 multiply outputs of the LPFs 627 and 629 by carriers, for frequency up conversion. An adder 643 adds signals received from the multipliers 631 and 633 and sends the resulting signal to a transmission antenna B.

The structure shown in FIG. 6 can be adapted as a forward channel transmitter in the TSTD base station. Forward channel transmitters include a pilot channel transmitter, a sync channel transmitter, a control channel transmitter, and a traffic channel transmitter. Considering that a pilot channel provides time synchronization for transmission of data on a forward link, the pilot channel transmitter can be configured to be an OTD structure, while the other channel transmitters can use the TSTD structure shown in FIG. 6.

Figure 7:
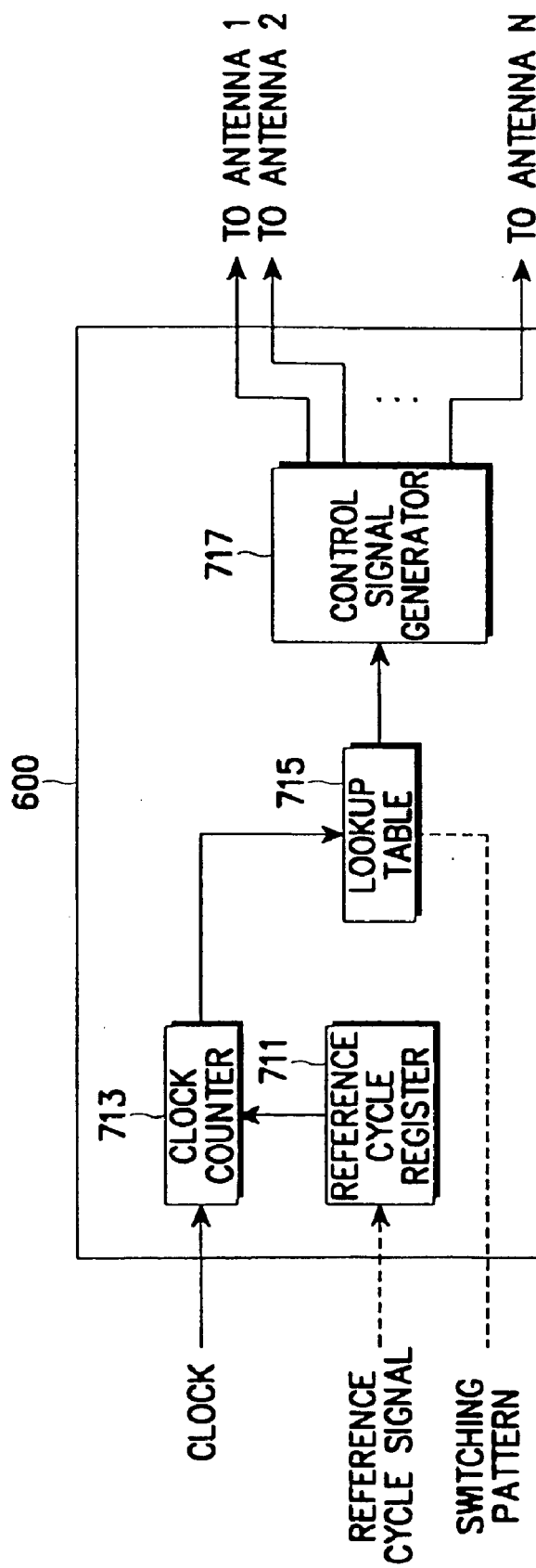
FIG. 7 is a block diagram of a controller shown in FIG. 6.

FIG. 7 is a block diagram of the controller 600 shown in FIG. 6. Referring to FIG. 7, a reference cycle register 711 stores a reference cycle signal received from an upper-level processor. The reference cycle signal acts as a time switching cycle in a channel transmitter. A clock counter 713 receives clock pulses from a base station system, counts the clock pulses in a reference cycle unit, and generates read pulses. A look-up table 715 stores switching pattern information received from the upper-level processor and outputs corresponding switching information in response to the read pulses received from the clock counter 713. A control signal generator 717 generates a switch controlling signal for distributing a PN spread signal to a plurality of transmission antennas according to the pattern information read from the look-up table 715.

By way of example, the controller 600 of FIG. 7 functions to connect a baseband output to N antennas for transmission in successive time intervals in a TSTD base station transmitter. The reference cycle register 711 stores a time switching cycle for a channel so that each channel can be uniquely time-switched. That is, designating a different reference cycle signal for each channel in the reference cycle register 711 results in transmission of each channel at a unique switching cycle rate. The value stored in the reference cycle register 711 is designated separately for each channel in the upper-level processor prior to transmission of the channel, and can be changed during data transmission under a separately determined control.

The clock pulses input to the clock counter 713 are provided from the base station system, synchronized to a reference time in the base station, and have a clock cycle proportional to an orthogonal code length. The clock counter 713 counts the clock pulses, compares the counted value with the value stored in the reference cycle register 711, and sends read pulses to the look-up table 715 at the time point when the values are equal.

The look-up table 715 is a memory for storing a time switching pattern of data transmitted through the N transmission antennas. A different switching pattern can be assigned to each channel, or channels can share the same switching pattern. The switching pattern stored in the look-up table 715 is to be transmitted from the base station to the terminal to allow the terminal to demodulate data based on the switching pattern.

The control signal generator 717 analyzes the switching pattern read from the look-up table 715 and controls signal paths to the N transmission antennas. That is, only one selected transmission antenna is enabled and the other transmission antennas are disabled.

In summary, the controller 600 counts input clock pulses, compares the counted value with a reference cycle value, and generates a read signal corresponding to a switching pattern stored in the look-up table 715 if the values are equal. The switching pattern information is used to select a transmission antenna in a subsequent step. The thus-obtained switching information is changed to an enable/disable signal for each transmission path.

Figure 8:
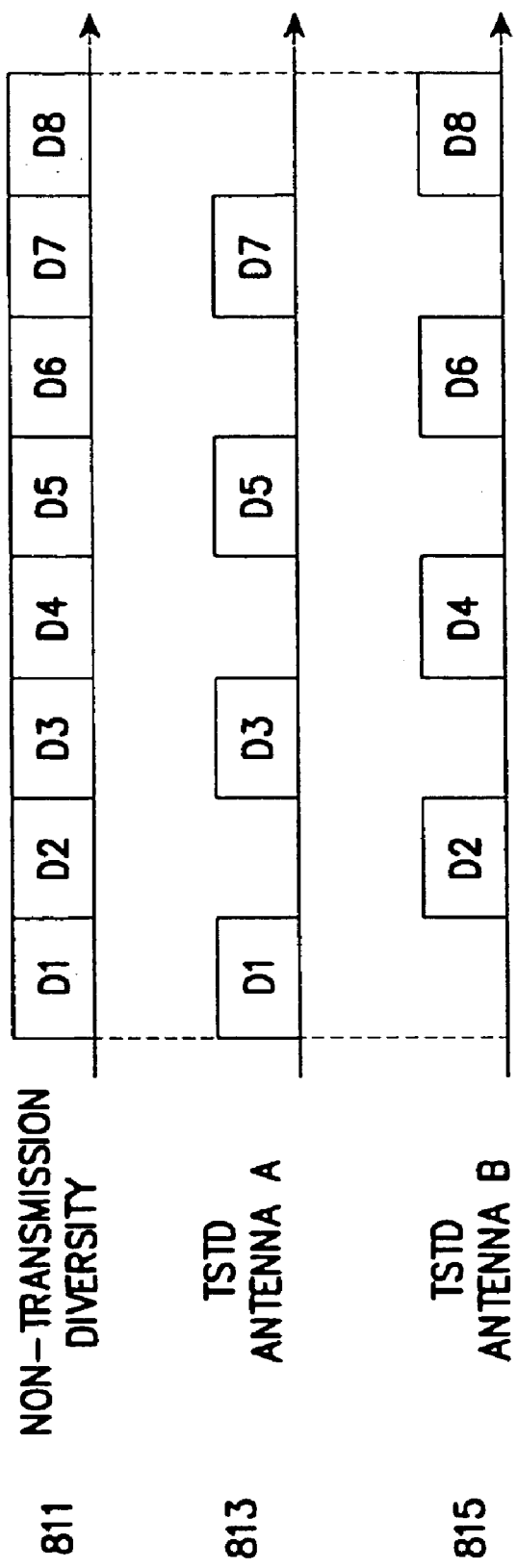
FIG. 8 illustrates timing characteristics of data transmitted in a periodic pattern from the TSTD transmitter of FIG. 6.

FIG. 8 illustrates a comparison between signal characteristics transmitted from a conventional NTD transmitter and the TSTD transmitter of the present invention shown in FIG. 6. In FIG. 8, reference numeral 811 illustrates an output timing of an NTD transmitter. Reference numerals 813 and 815 illustrate the timings of signals respectively transmitted through transmission antennas A and B in the TSTD transmitter. It is apparent that only one antenna is active (i.e., A or B) at any point in time in accordance with the teachings of the present invention.

In operation, the TSTD transmitter uses one orthogonal code per user, as compared to an OTD transmitter requiring as many orthogonal codes as there are transmission antennas. Further, the OTD transmitter operates in the same manner as the NTD transmitter, up to PN spreading. Then, for an TSTD transmitter the PN spread data is switched to each transmission antenna in a cycle equal to an integer multiple of an orthogonal code length, either in a periodic pattern for sequential data transmission to the N transmission antennas or in a random pattern. The time switching pattern used is determined by the output of the look-up table 715 in the controller 600, and a time switching cycle is determined by a reference cycle value stored in the reference cycle register 711.

Figure 9:
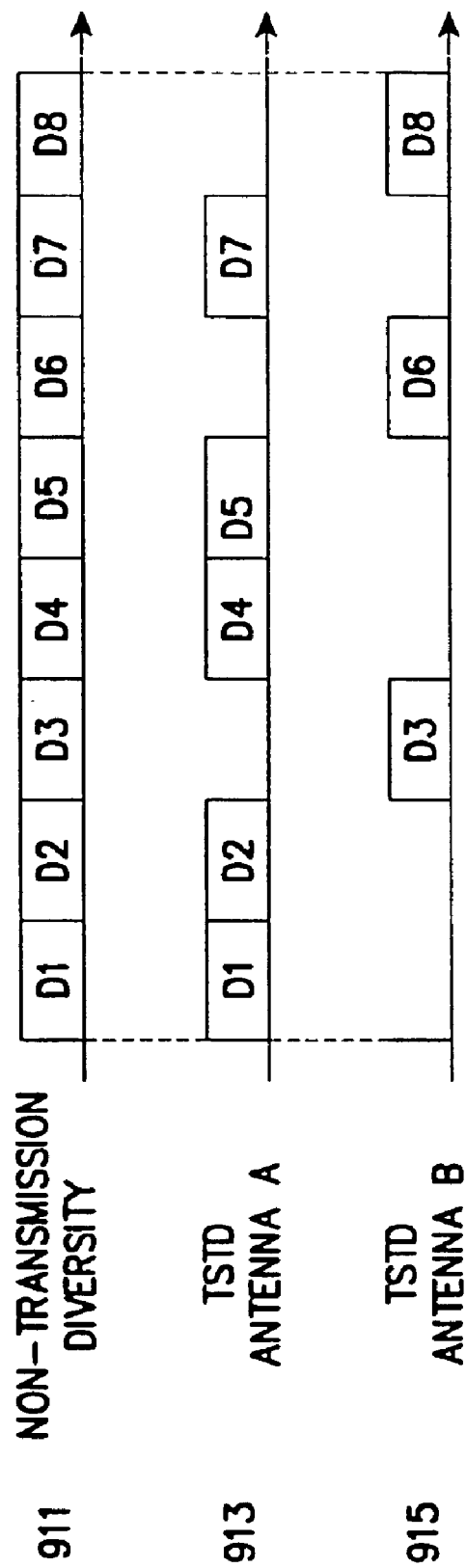
FIG. 9 illustrates timing characteristics of data transmitted in a random pattern from the TSTD transmitter of FIG. 6.

FIG. 9 illustrates, by way of example, a random transmission pattern from two antennas (i.e., A and B), while FIG. 8 illustrates a periodic pattern for antennas A and B. With reference to FIG. 9, look-up table 715 would be loaded, for example, with a switching pattern requiring that data should be connected to the transmission antenna A for two consecutive iterations and then to transmission antenna B once in the TSTD transmitter of FIG. 6. In response, the controller 600 control the switch 621 to connect the output of the PN spreader 619 to the LPFs 623 and 625 for two consecutive switching cycles and to the LPFs 627 and 629 for one subsequent switching cycle. As a result, the timings of signals output from the transmission antennas A and B are shown as indicated by 913 and 915 of FIG. 9, respectively. Random time switching patterns can additionally offer the data scrambling effect.

Figure 10:
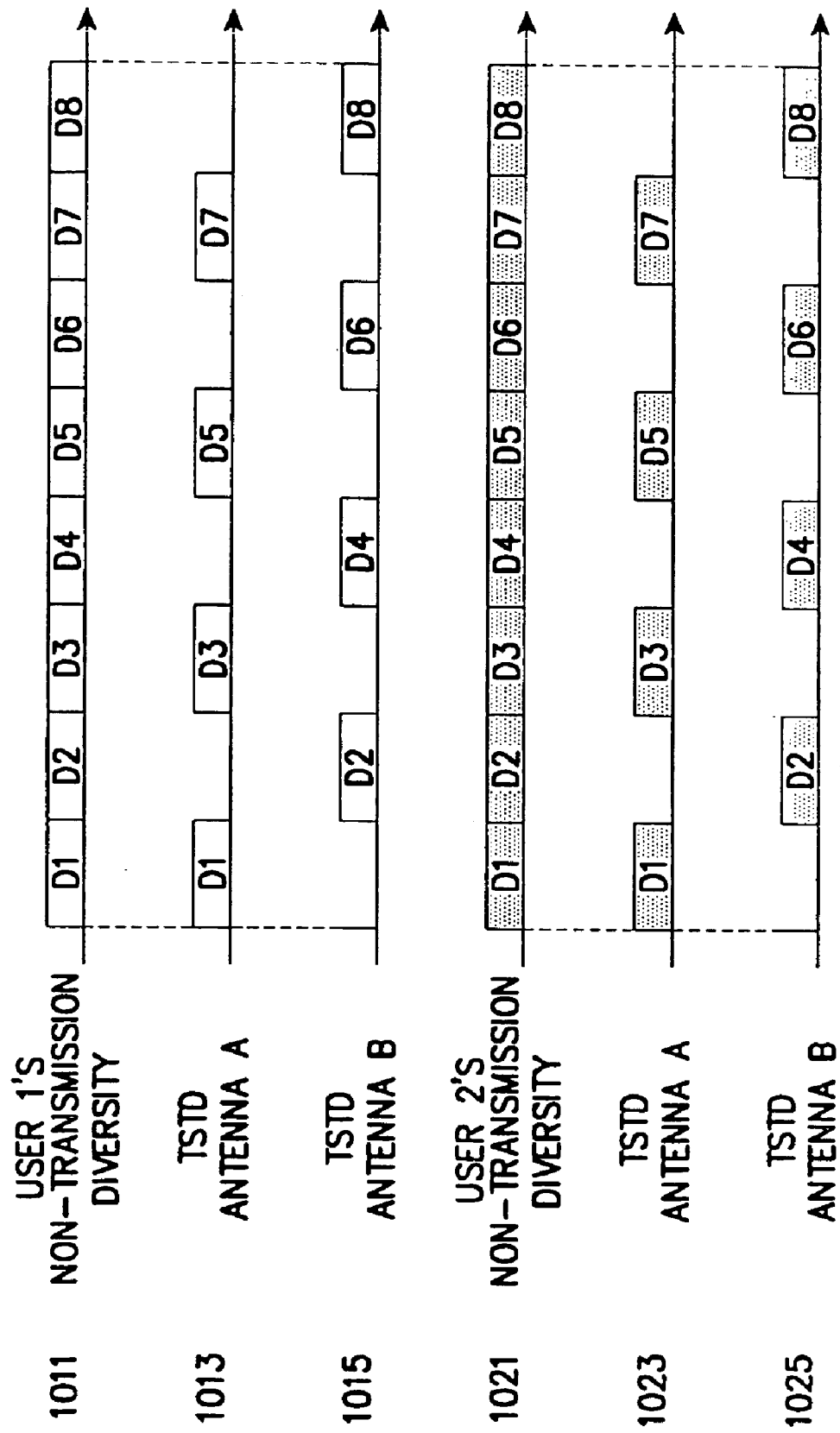
FIG. 10 illustrates timing characteristics of data for plural users synchronously transmitted from the TSTD transmitter of FIG. 6.

FIG. 10 is a timing diagram of user data under the following conditions: N=2, two users, and synchronous time switching in the TSTD transmitter of a base station.

Figure 11:
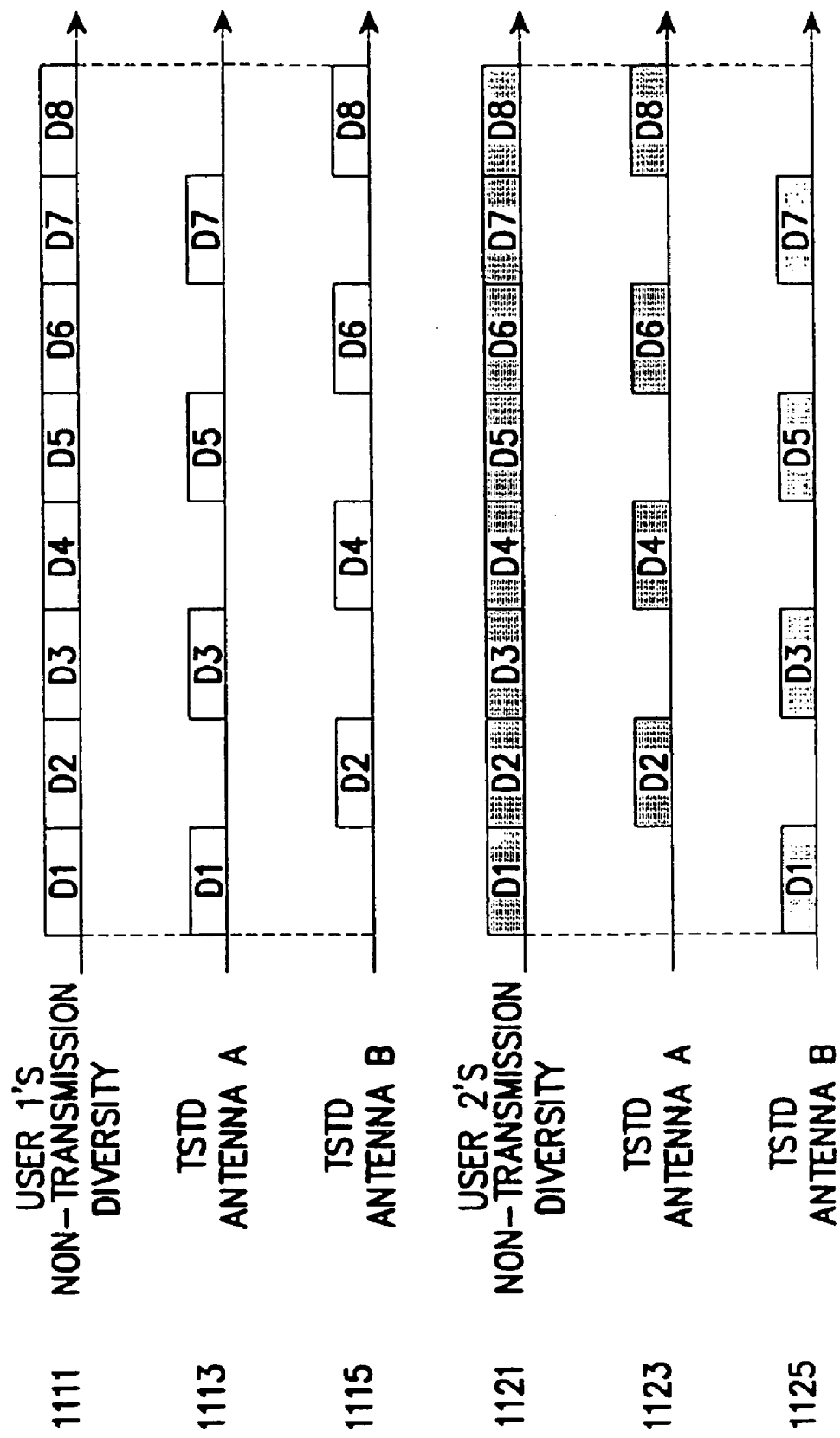
FIG. 11 illustrates timing characteristics of data for a plurality of users asynchronously transmitted from the TSTD transmitter of FIG. 6.

FIG. 11 is a timing diagram of user data under the following condition: N=2, two users, and asynchronous time switching in the TSTD transmitter. Synchronous time switching is distinguishable from asynchronous time switching depending upon whether the same or different time switching schemes are applied to all terminals for a base station.

Figure 12:
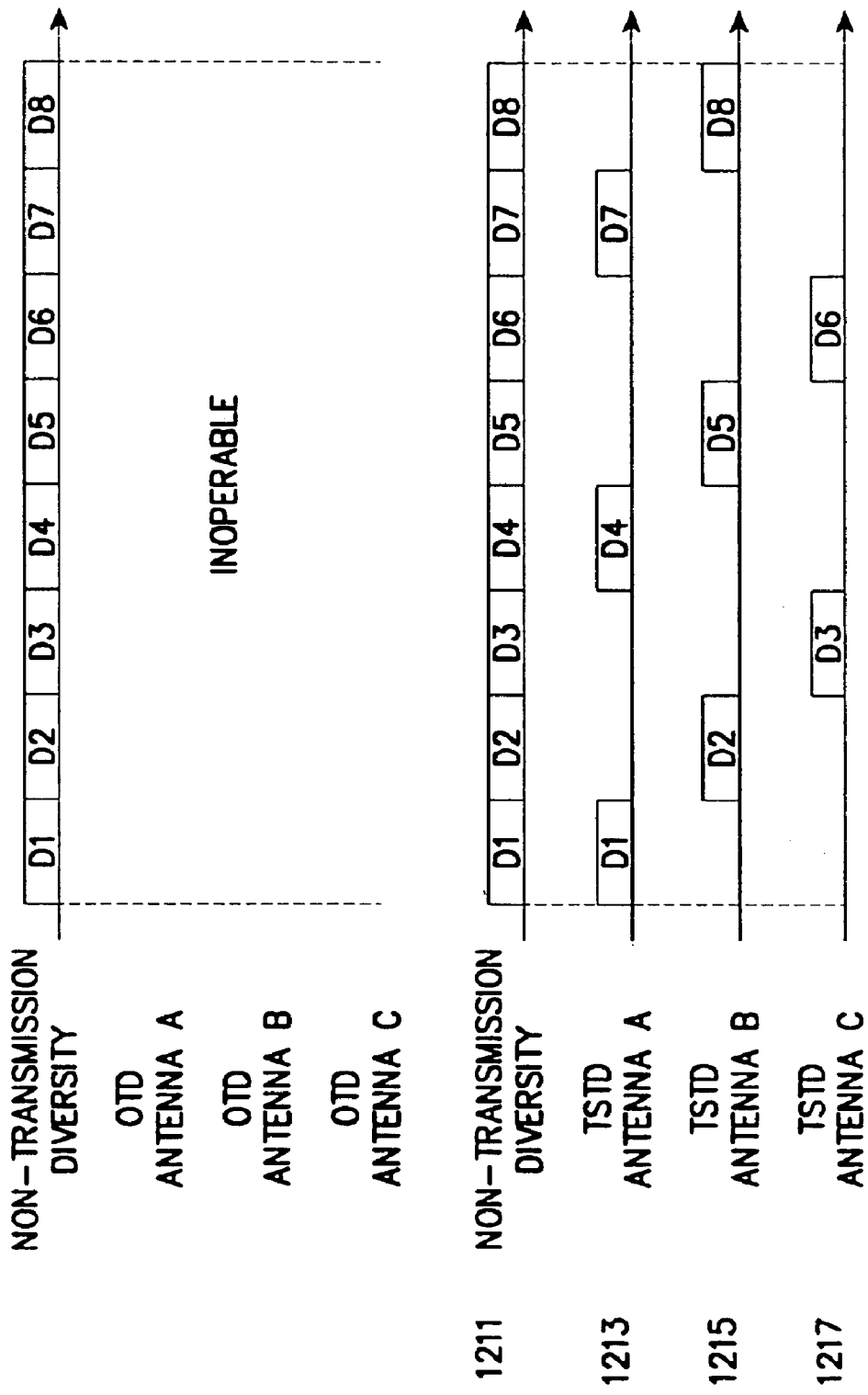
FIG. 12 describes transmission antenna extensibility in a TSTD transmitter of the mobile communication system according to the embodiment of the present invention.

FIG. 12 is a timing diagram comparing user data transmitted from a TSTD transmitter and the OTD transmitter. In FIG. 12, N=3 and a periodic pattern is selected. As illustrated, the TSTD transmitter exhibits time diversity with three transmission antennas. This result is not obtainable in the OTD case.

Two types of receiving devices may be used for a terminal corresponding to a TSTD transmitting device. In one type, OTD is applied to a pilot channel and TSTD to all other channels. In the second type, TSTD is applied to all channels including the pilot channel and user data channels.

Figure 13:
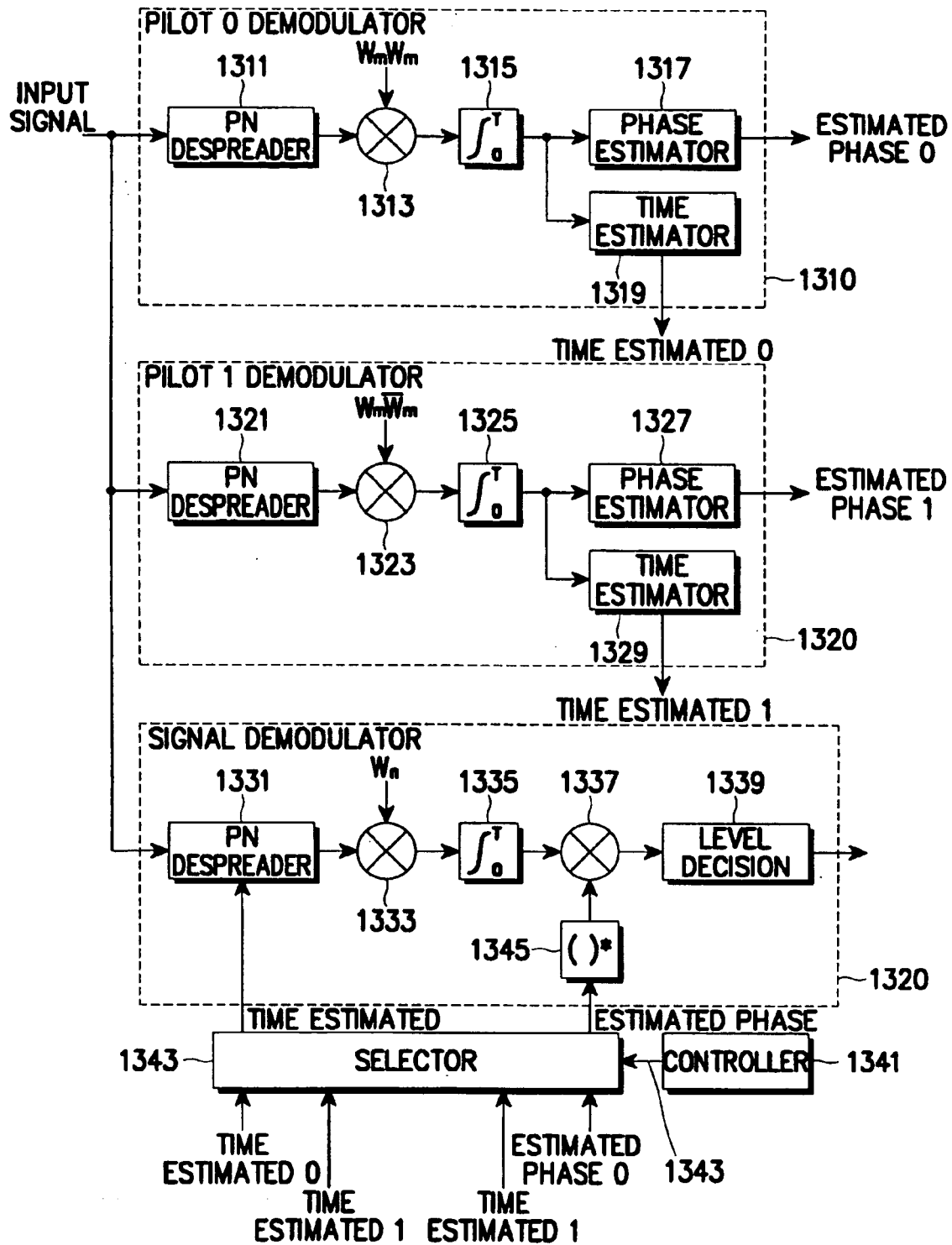
FIG. 13 is a block diagram of an embodiment of a receiving device for receiving data from a TSTD transmitting device in the mobile communication system according to the present invention.
Figure 14:
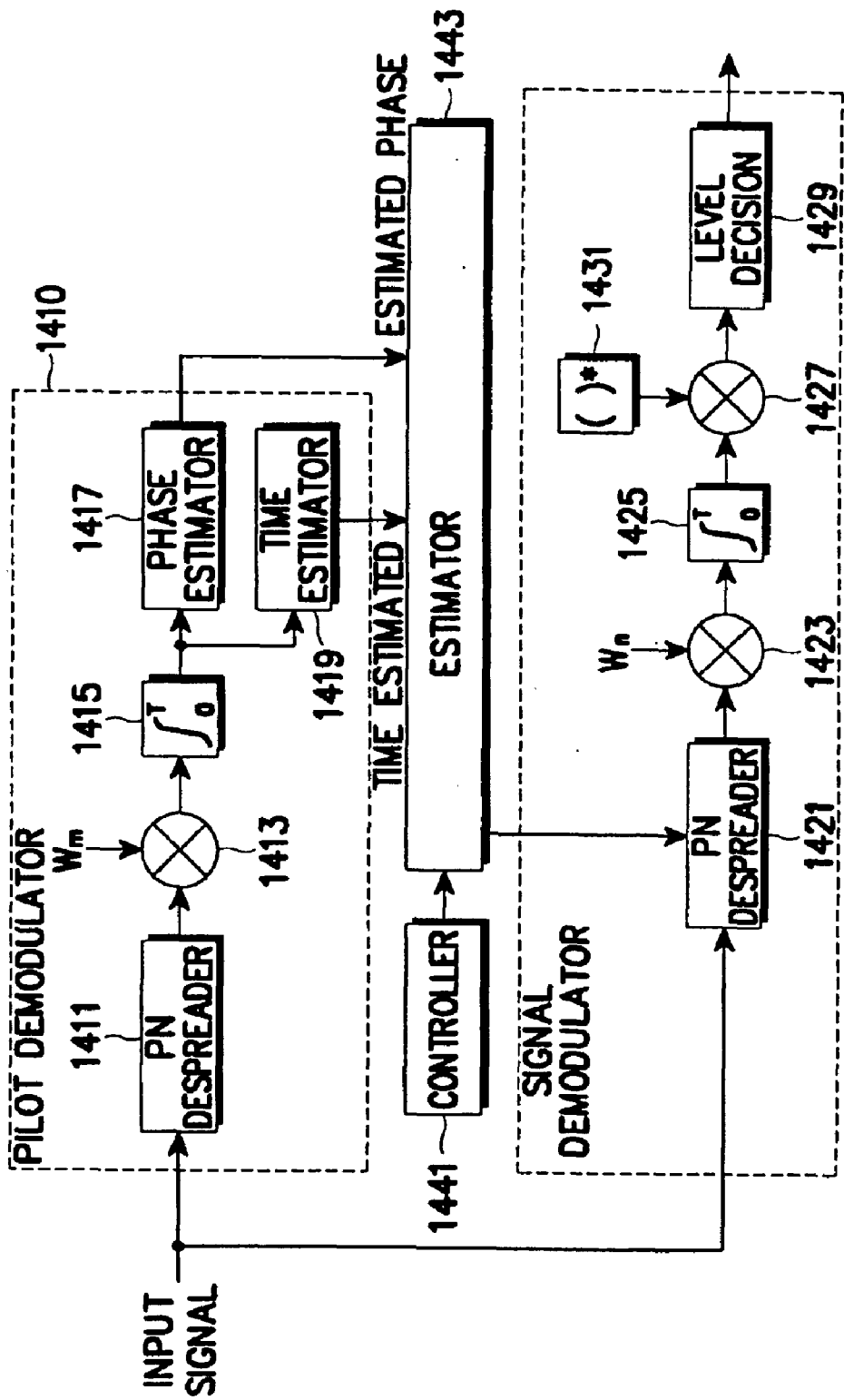
FIG. 14 is a block diagram of another embodiment of a receiving device for receiving data from a TSTD transmitting device in the mobile communication system according to the present invention.

FIGS. 13 and 14 are block diagrams of the two types of receiving devices. Because the pilot channel is a common channel for synchronizing the PN code between the base station and the terminal. Either OTD or TSTD with a predetermined cycle and pattern can be rendered to transmission of the pilot channel.

FIG. 13 is a block diagram of a receiving device for receiving a baseband signal from a transmitting device having two transmission antennas, a TSTD traffic channel transmitter, and an OTD pilot channel transmitter. Referring to FIG. 13, the receiver includes a number of pilot channel receivers equal to the number of transmission antennas of the transmitting device. Specifically, two pilot channel receivers 1310 and 1320 are provided corresponding to transmission antennas A and B. The pilot channel receivers should preferably use orthogonal codes extended in length, proportional to the number of the transmission antennas.

In the pilot channel receiver 1310, a PN despreader 1311 multiplies an input signal by a PN sequence, for PN despreading. A multiplier 1313 orthogonally demodulates the signal received from the PN despreader 1311 by multiplying the received signal by the same orthogonal code [$W_m$ $W_m$] as the one used in the pilot channel transmitter. An integrator 1315 integrates a signal received from the multiplier 1311 for a time T and sums the integrated values. A phase estimator 1317 analyzes a signal received from the integrator 1315 and outputs an estimated phase value 0 of the pilot signal received through the transmission antenna A. A time estimator 1319 analyzes the signal received from the integrator 1315 and outputs an estimated time value 0 as the transmission time of the pilot signal received through the transmission antenna A. The time estimator 1319 outputs an estimated time value 1 as the transmission time of the pilot signal received through the transmission antenna B.

In the pilot channel receiver 1320, a PN despreader 1321 multiplies the input signal by a PN sequence, for PN despreading. A multiplier 1323 orthogonally demodulates the signal received from the PN despreader 1321 by multiplying the received signal by the same orthogonal code [$W_m$ $\overline{W_m}$] as the other used in the pilot channel transmitter. An integrator 1325 integrates a signal received from the multiplier 1321 for a time T and sums the integrated values. A phase estimator 1327 analyses a signal received from the integrator 1325 and outputs an estimated phase value 1 of the pilot signal received through the transmission antenna B. A time estimator 1329 analyses the signal received from the integrator 1325 and outputs an estimated time value 1 as the transmission time of the pilot signal received through the transmission antenna B.

A controller 1341 synchronizes to a reference time of the base station and generates a control signal for selecting the outputs of the pilot channel receivers 1310 and 1320 in a time switching cycle unit. A selector 1343 selectively outputs the estimated phase and time values received from the pilot channel receivers 1310 and 1320 on the basis of the control signal of the controller 1341.

In a traffic channel receiver 1330, a PN despreader 1331 multiplies an input signal at a transmission time position indicated by the time signal received from the selector 1343 by a PN sequence. That is, the PN despreader 1331 despreads the input signal by the PN code at the estimated switching time position. A multiplier 1333 multiplies the orthogonal code [$W_n$] used in the traffic channel transmitter by a signal received from the PN despreader 1331. An integrator 1335 integrates a signal received from the multiplier 1333 for the time T and sums the integrated values. A phase sign converter 1345 changes the sign of the phase value received from the selector 1343. A multiplier 1337 multiplies the output of the integrator 1335 by the output of the phase sign converter 1345, to synchronize the phase of the input signal. A level decision block 1339 detects the level of a signal received from the multiplier 1337 and changes the signal level to a gray level. The signal output from the level decision block 1339 is fed to a decoder in the receiver.

The receiving device shown in FIG. 13 includes pilot channel demodulators equal to the number of transmission antennas employed, N. In the present example, N=Z. These pilot channel receivers are similarly configured as the OTD receivers and operate in the same manner. A single traffic channel receiver 1330 is all that is required because even though modulation of user data is distributed to N transmission antennas, each of the n data paths use the same orthogonal code.

The estimated time and phase information for the N transmission antennas is selectively provided from the pilot channel receivers 1310 and 1320 to the traffic channel receiver 1330 by the selector 1343 based on the clock signal of the controller 1341 synchronized to the base station. That is, the terminal obtains switching cycle and pattern information from the base station during a call set-up.

The controller 1341 obtains the information pertaining to the current selected switching scheme by demodulating a sync channel based on time and phase information pilot obtained from a demodulated pilot channel and analyzing information loaded on the demodulated sync channel. Upon detection of the switching scheme for TSTD in a receiving device, the terminal can be synchronized to the base station for time switching.

The traffic channel receiver 1330 subjects a user data signal to PN despreading using the estimated time value selectively received from the selector 1343 and orthogonally demodulates the PN spread signal. Then, it integrates the orthogonal modulation signal for one cycle, and multiplies the integrated value by a value obtained from converting the sign of phase information selected by the selector 1343, to thereby compensate for a phase error which occurs during data transmission. The phase-compensated integrator output is subjected to soft decision and converted to a probability value in the level decision block 1339 and fed through a P/S converter (not shown) to a deinterleaver (not shown).

FIG. 14 is a block diagram of another embodiment of a receiving device for receiving a signal from a transmitting device having a TSTD structure for all channel transmitters. The receiving device in this embodiment includes a single pilot channel receiver since a pilot channel signal is also time switched for transmission.

In a pilot channel receiver 1410, a PN despreader 1411 multiplies an input signal by a PN sequence, for PN despreading. A multiplier 1413 orthogonally demodulates the signal received from the PN despreader 1411 by multiplying the received signal by the same orthogonal code $W_m$ as that used in a corresponding pilot channel transmitter. An integrator 1415 integrates a signal received from the multiplier 1411 for a time T and sums the integrated values. A phase estimator 1417 analyses a signal received from the integrator 1415 and outputs an estimated phase value of a pilot channel signal received through transmission antennas. A time estimator 1419 analyzes the signal received from the integrator 1415 and outputs an estimated time value as the transmission time of the pilot channel signal received through the transmission antennas.

A controller 1441 synchronizes to a reference time of the base station and generates a control signal for selecting the outputs of the pilot channel receiver 1410 in a time switching cycle unit. A selector 1443 selectively outputs the estimated phase and time values received from the pilot channel receiver 1410 on the basis of the control signal of the controller 1441.

In a traffic channel receiver 1420, a PN despreader 1421 multiplies an input signal at a time position indicated by the time signal received from the selector 1343 by a PN sequence. That is, the PN despreader 1421 despreads the input signal by the PN code at the estimated switching time position. A multiplier 1423 multiplies the orthogonal code [$W_n$] used in a corresponding traffic channel transmitter by a signal received from the PN despreader 1421. An integrator 1425 integrates a signal received from the multiplier 1423 for the time T and sums the integrated values. A phase sign converter 1431 changes the sign of the phase value received from the selector 1443. A multiplier 1427 multiplies the output of the integrator 1425 by the output of the phase sign converter 1431, to synchronize the phase of the input signal. A level decision block 1429 detects the level of a signal received from the multiplier 1427 and changes the signal level to a gray level. The signal output from the level decision block 1429 is fed to a decoder in the receiver.

The receiving device shown in FIG. 14 shows an example where TSTD is executed on a pilot channel as well as traffic channels. Since one orthogonal code is used for the pilot channel, which differs from the receiving device of FIG. 13, all necessary timings and estimated phases can be generated by the use of the single pilot channel receiver 1410 with implementation of the same time switching technique as that for the traffic channel receiver 1420.

In summary, TSTD on a forward link in a mobile communication system offers the following advantages:

(1) only one traffic channel receiver is needed for demodulating user data regardless of the number N of transmission antennas, since one orthogonal code is available per user, which enables simplification of a receiver, low power dissipation and low terminal costs;

(2) The length of an orthogonal code is unchanged by virtue of using the orthogonal code in an NTD device. Therefore, there is no increase of an integration interval for providing time diversity and no degradation of the reception performance possibly caused by a channel environment such as a frequency error;

(3) The number of available transmission antennas is not limited, thereby imposing no constraints on other applications; and (4) A scrambling effect can be added to improvement in reception performance by applying different switching techniques to users in a base station.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A transmitting apparatus for a code division multiple access (CDMA) communication system, comprising:
    a signal generator for generating a modulation signal by multiplying +1 or −1 signal with a code having predetermined code length;
    at least two transmit antennas;
    at least two RF transmitters, each of the RF transmitters coupled to a respective one of the antennas, for converting the signal generated by the signal generator to an RF signal and outputting the RF signal through the respective antennas; and
    a time switching transmission controller for switching the transmission signal to one of the RF transmitters in order to performing time switched transmission diversity (TSTD), wherein the switching cycle is an integer multiple of the code length.

2. The transmitting apparatus of claim 1, wherein the time switching transmission controller comprises:
    a controller having pre-stored switching patterns, for generating a switch controlling signal based on one of the pre-stored switching patterns, said controlling signal being generated at said fixed non-overlapping predetermined time interval; and
    a switch connected between an output terminal of the spreader and an input terminal each of said plurality of RF transmitters, for switching the output of the spreader to a corresponding RF transmitter based on the switch controlling signal.

3. The transmitting apparatus of claim 2, wherein the controller comprises:
    a reference cycle storage for storing a reference switching cycle value;
    a counter for counting clock pulses of a base station and outputting a counted value based on the reference switching cycle value;
    a memory for storing a plurality of switching patterns and outputting one of said plurality of switching patterns based on the counted value; and
    a control signal generator for generating the switch controlling signal according to the switching pattern selected from the memory.

4. The transmitting apparatus of claim 3, wherein the memory stores at least one of a sequential switching pattern, a random switching pattern, a switching pattern with a uniform switching cycle, and a switching pattern with a variable switching cycle, and the control signal generator generates the switch controlling signal with length equal to an integer multiple of an orthogonal code length.

5. A code division multiple access (CDMA) mobile communication system, comprising:
    a signal generator for generating a modulation signal by modulating +1 or −1 signal with a code having predetermined code length;
    first and second transmit antennas;
    first and second RF transmitters, each of the RF transmitters coupled to a respective one of the antennas, for converting the signal generated by the signal generator to an RF signal and outputting the RF signal through the respective antennas;
    a time switching transmission controller for switching the transmission signal to one of the RF transmitters in order to performing time switched transmission diversity(TSTD), wherein the switching cycle is an integer multiple of the code length;
    a receiver for receiving the RF signal transmitted through the antennas, the receiver at least comprising first pilot demodulator for estimating a phase of the first pilot signal transmitted through the first antenna and second pilot demodulator for estimating a phase of the second pilot signal transmitted from the second antenna;
    a controller for alternatively selecting the first estimated phase or the second estimated phase according to the switching cycle to support the TSTD reception; and
    a demodulator for detecting the modulation signal with the first estimated phase or the second estimated phase according to the selection of the controller.

6. A code division multiple access (CDMA) channel signal transmitting method in a CDMA mobile communication system, comprising the steps of:
    generating a modulation signal by modulating +1 or −1 signal with a code having predetermined code length;
    switching the modulation signal to a first RF transmitter connected to a first antenna or a second RF transmitter connected to a second antenna with non-overlapping time intervals; and
    converting the modulation signal to a radio frequency(RF) signal to transmitting the RF signal through one of the antennas, wherein a cycle of the switching is an integer multiple of the code length.

7. A channel signal receiving method in a code division multiple access (CDMA) mobile communication system, comprising the steps of:
    generating a modulation signal by modulating +1 or −1 signal with a code having predetermined code length;
    switching the modulation signal to a first RF transmitter connected to a first antenna or a second RF transmitter connected to a second antenna with non-overlapping time intervals;
    converting the modulation signal to a radio frequency(RF) signal to transmitting the RF signal through one of the antennas, wherein a cycle of the switching is an integer multiple of the code length;
    receiving the RF signal transmitted through the antennas;
    estimating a phase of the first pilot signal transmitted through the first antenna and a phase of the second pilot signal transmitted from the second antenna;
    alternatively selecting the first estimated phase or the second estimated phase according to the switching cycle to support the TSTD reception; and
    detecting the modulation signal with the first estimated phase or the second estimated phase according to the selection.

8. A transmitting apparatus in a code division multiple access (CDMA) mobile communication system, comprising:
    a signal generator for generating a transmission signal by modulating +1 or −1 signal with a code having predetermined code length;

two or more transmit antennas;

two or more RF transmitters, each of the RF transmitters connected to a respective one of the antennas, for converting the signal generated by the signal generator to an RF signal and outputting the RF signal through the respective antenna; and a time switching transmission controller for alternately switching the transmission signal to one of the RF transmitters for a fixed, non-overlapping predetermined time unit to provide time switching transmission diversity (TSTD), wherein the switching cycle of the controller is an integer multiple of the code length.

9. The transmitting apparatus of claim 8, wherein the time switching transmission controller comprises:

a controller having pre-stored switching patterns, for generating a switch controlling signal based on one of the pre-stored switching patterns, said controlling signal being generated at said fixed non-overlapping predetermined time unit; and a switch connected between the signal generator and an input terminal of each of said two or more RF transmitters, for switching the transmission signal to one of the RF transmitters based on the switch controlling signal.

10. The transmitting apparatus of claim 9, wherein the controller comprises:

a reference cycle storage for storing a reference switching cycle value;

a counter for counting clock pulses of a base station and outputting a counted value based on the reference switch cycle value;

a memory for storing a plurality of switching patterns and outputting one of said plurality of switching patterns based on the counted value; and a control signal generator for generating the switch controlling signal according to the switching pattern selected from the memory.

11. The transmitting device of claim 10, wherein the memory stores at least one of a sequential switching pattern, a random switching pattern, a switching pattern with a uniform switching cycle, and a switching pattern with a variable switching cycle and the control signal generator generates the switch controlling signal with length equal to an integer multiple of an orthogonal code length.

12. A transmitting method in a code division multiple access (CDMA) mobile communication base station system, having two or more antennas and two or more RF transmitters, each of the RF transmitters connected to a respective one of the antennas for converting an input signal to an RF signal and outputting the RF signal through the respective antenna, comprising the steps of:

generating a transmission signal by modulating +1 or −1 signal with a code having predetermined code length; and transmitting the transmission signal to one of the RF transmitters for a predetermined time unit to provide time switching transmission diversity (TSTD) and transmitting the transmission signal, wherein the transmission cycle is an integer multiple of the code length.

13. The transmitting method of claim 12, wherein the transmitting step comprises the steps of:

generating a switch controlling signal based on a switching pattern at the predetermined time unit; and switching the transmission signal to the RF transmitter to be connected corresponding antenna based on the switch controlling signal.

14. The transmitting method of claim 13, wherein the switch controlling signal generation step comprises the steps of:

generating a reference switching cycle signal;

counting clock pulses of a base station and outputting the counted value at the time point when the reference switching cycle value is generated;

outputting the switching pattern based on the counted value; and generating the switch controlling signal according to the switching pattern.

15. The transmitting method of claim 14, wherein the switching pattern is at least one selected from the group of a sequential switching pattern, a random switching pattern, a switching pattern with a uniform switching cycle, and a switching pattern with a variable switching cycle, and the switch controlling signal is an integer multiple of an orthogonal code length.

* * * * *